United States Patent
Lin

(10) Patent No.: US 8,203,838 B2
(45) Date of Patent: Jun. 19, 2012

(54) BATTERY COVER ASSEMBLY FOR PORTABLE ELECTRONIC DEVICE

(75) Inventor: Pao-Chun Lin, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 285 days.

(21) Appl. No.: 12/712,299

(22) Filed: Feb. 25, 2010

(65) Prior Publication Data

US 2011/0149487 A1 Jun. 23, 2011

(30) Foreign Application Priority Data

Dec. 22, 2009 (CN) .......................... 2009 1 0312002

(51) Int. Cl.
*G06F 1/16* (2006.01)
*H01M 2/10* (2006.01)
*H04M 1/00* (2006.01)

(52) U.S. Cl. ..................... 361/679.58; 429/97; 429/100; 455/575.1

(58) Field of Classification Search ................................ 361/679.01–679.45, 679.55–679.59; 455/575.1, 455/575.8; 429/97, 100
See application file for complete search history.

(56) References Cited

U.S. PATENT DOCUMENTS

| | | | |
|---|---|---|---|
| 2004/0224556 A1* | 11/2004 | Qin et al. | 439/500 |
| 2004/0229114 A1* | 11/2004 | Liang et al. | 429/100 |
| 2006/0139856 A1* | 6/2006 | Liu et al. | 361/600 |
| 2006/0175840 A1* | 8/2006 | Wang et al. | 292/228 |
| 2007/0026297 A1* | 2/2007 | Qin et al. | 429/97 |
| 2007/0111086 A1* | 5/2007 | Li et al. | 429/97 |
| 2007/0298318 A1* | 12/2007 | Li | 429/97 |
| 2009/0258287 A1* | 10/2009 | Shi | 429/100 |
| 2010/0028763 A1* | 2/2010 | Zhou et al. | 429/100 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A battery cover assembly for a portable electronic device includes a base body, a battery cover, a pivot member, and a button. The base body forms two support portions. The battery cover forms a clasp. The pivot member is received in the support portions. The button is rotatably connected to the base body by the pivot member. The latch member forms two latch plates. The clasp engages with the latch plates to allow the battery cover to releasably latch to the housing.

10 Claims, 6 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. Batteries are replaced by opening the battery covers when, for example, the batteries are damaged and/or dead (i.e. no longer rechargeable).

Although battery cover assemblies may be simple, engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
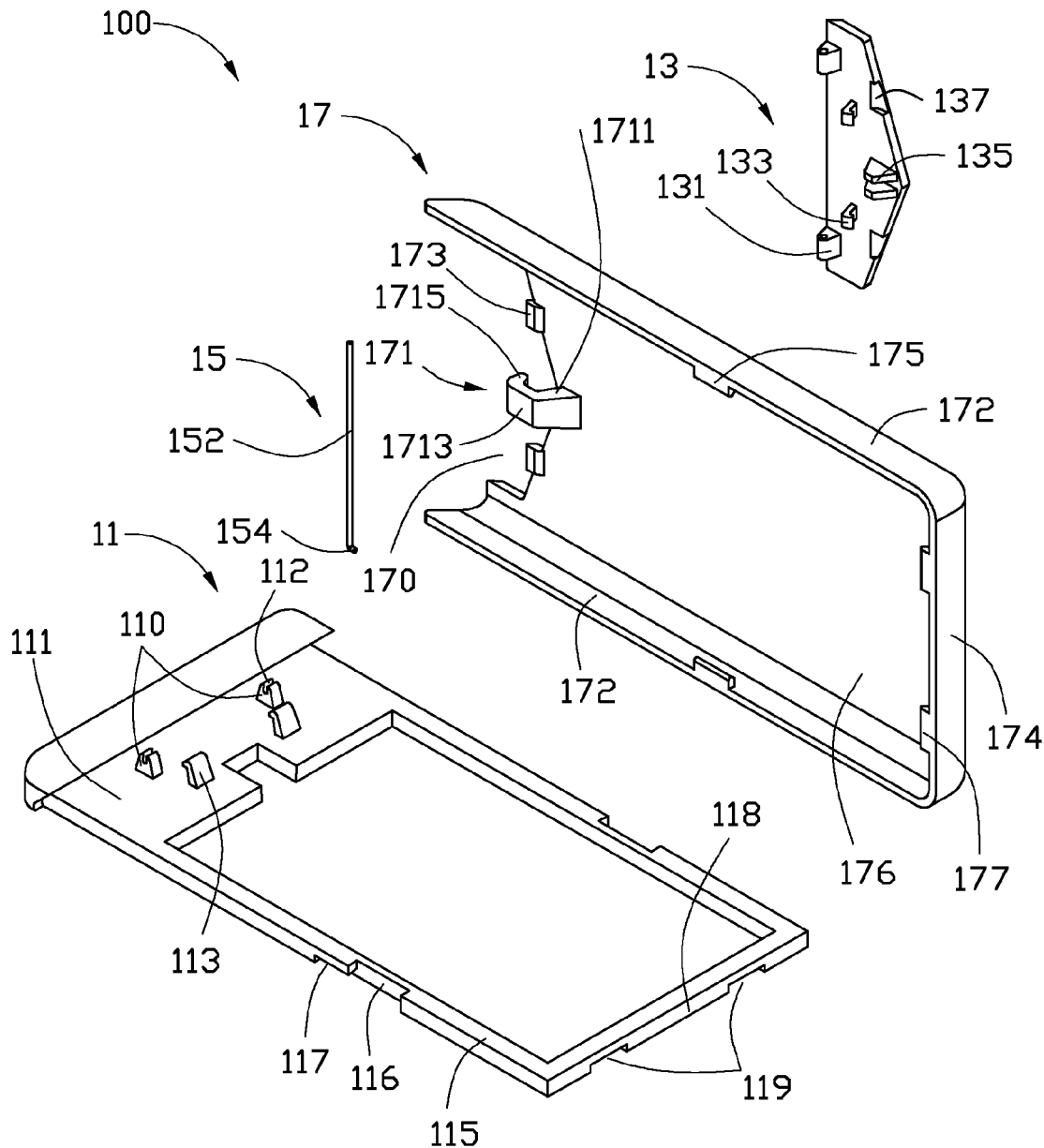
FIG. 1 is an exploded, isometric view of a portable electronic device employing a battery cover assembly in accordance with an exemplary embodiment.

FIG. 1 show a portable electronic device 100, such as a mobile phone, employing a battery cover assembly. The mobile phone 100 is an exemplary application, for the purposes of describing details of an exemplary embodiment of a battery cover assembly. The battery cover assembly incorporates a base body 11, a button 13, a pivot member 15, and a battery cover 17. The button 13 rotatably connects the battery cover 17 to the base body 11 with the pivot member 15, and releasably latches the battery cover 17 to the base body 11.

The base body 11 includes an end portion 111, two side portions 115, and a connected portion 118, cooperatively defining a cavity for receiving a battery (not shown). The end portion 111 forms two support portions 112 and two hooks 113. The two support portions 110 are arranged along a first line. Each support portion 110 defines a groove 112. The two hooks 113 are arranged along a second line, parallel to the first line. A distance between the hooks 113 is shorter than the distance between the two support portions 110. Each side portion 115 defines a cutout 116 and a slot 117 communicating with each other. The connected portion 118 defines two detents 119.

Figure 2:
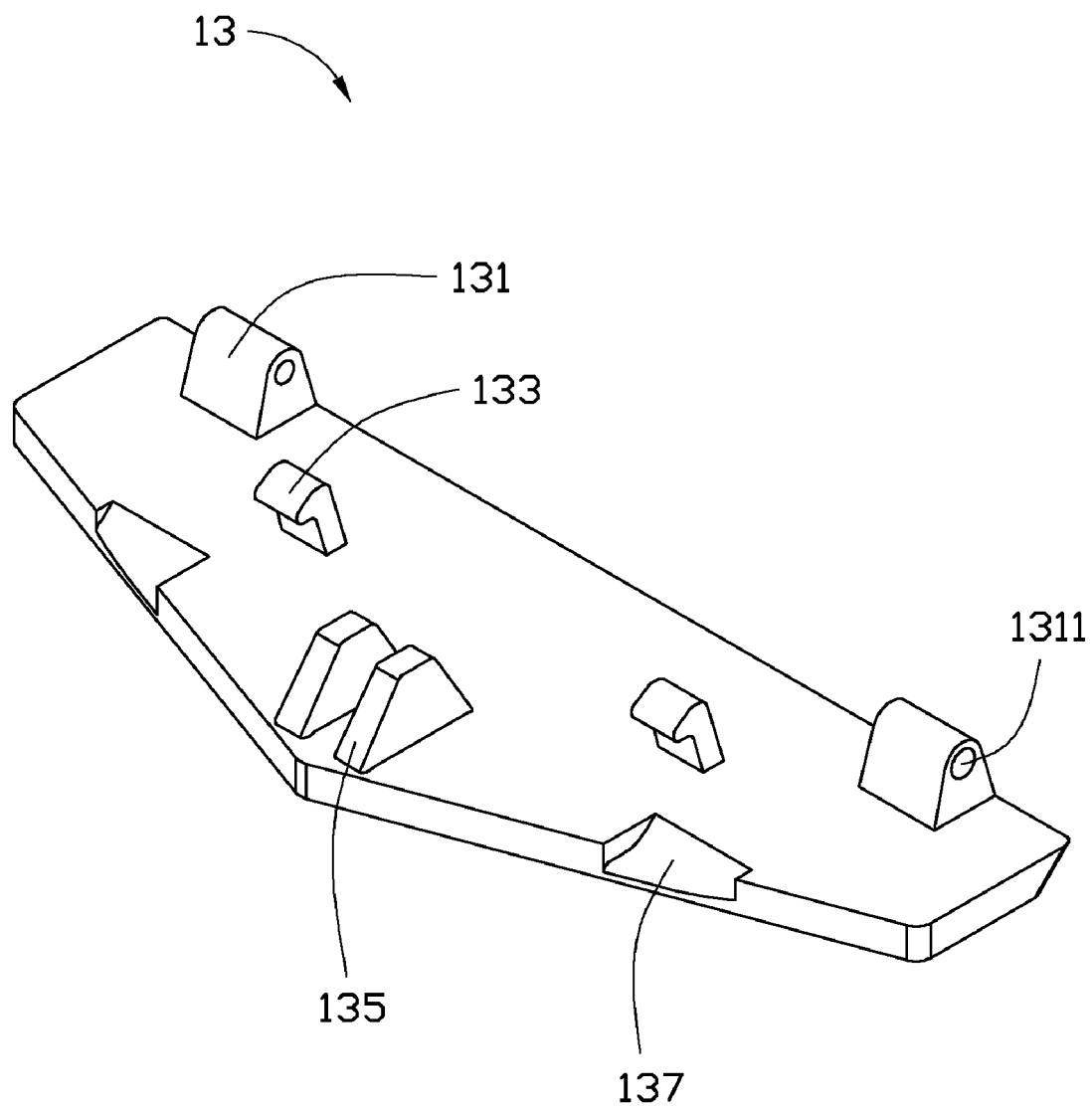
FIG. 2 is an enlarged view of the button shown in FIG. 1.

Referring to FIG. 2, the button 13 is substantially a symmetrical delta-shaped pentagon. Two fixed portions 131 are equidistantly positioned along a straight edge of the pentagon. Each fixing portion 131 defines a through hole 1311. Two trapezoidal latch plates 135 are positioned at the vertex of the pentagon's two inclined sides opposite to the straight edge. Two catches 133 are positioned between the fixed portions 131 and the latch plates 135. A distance between the catches 133 is shorter than the distance between the two fixed portions 131. A notch 137 is defined at each inclined side.

The pivot member 15 includes a cylindrical body 152 and a bent portion 154 integrally formed together. The cylindrical body 152 may be received in the grooves 112 and the through holes 1311. The bent portion 154 may prevent the pivot member 15 from separating from the button 13.

The battery cover 17 includes a back plate 176, two sidewalls 172, and a connecting wall 174. The back plate 176 defines an opening 170 corresponding to the button 13. The back plate 176 forms a clasp 171. The clasp 171 includes an inclined portion 1711, an extended portion 1713, and a latching portion 1715. The inclined portion 1711 is substantially parallel to one side of the latch plates 135. The extended portion 1713 is substantially parallel to the back plate 176. The back plate 176 forms a projection 173 at each side of the clasp 171 toward the opening 170. Each sidewall 172 forms a tab 175 engagable in the slot 117. The connecting wall 174 forms a protrusion 177 engagable in the notches 119.

Figure 3:
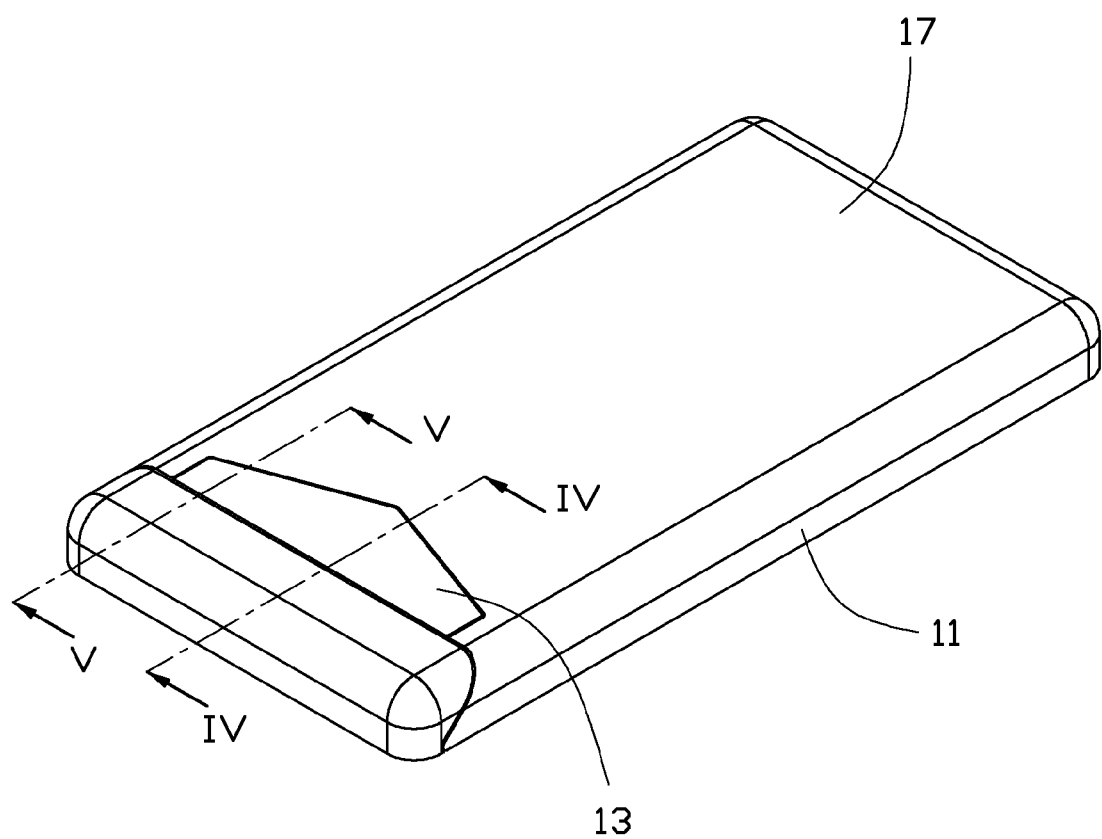
FIG. 3 is an assembled view of FIG. 1.
Figure 4:
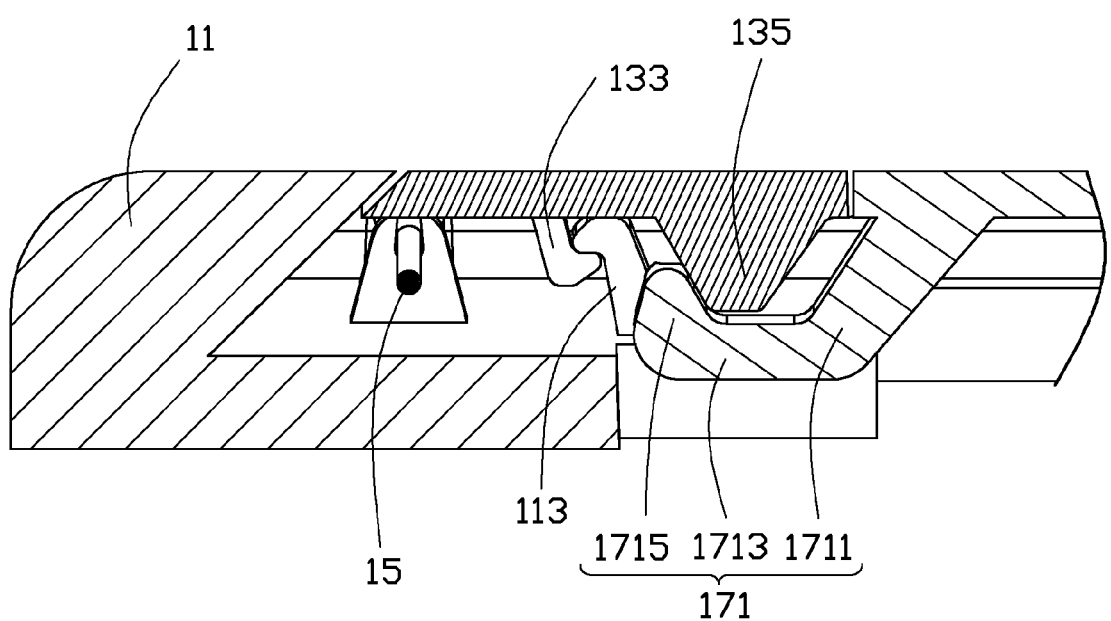
FIG. 4 is a cross sectional view of the battery cover assembly of FIG. 3 along line IV-IV.
Figure 5:
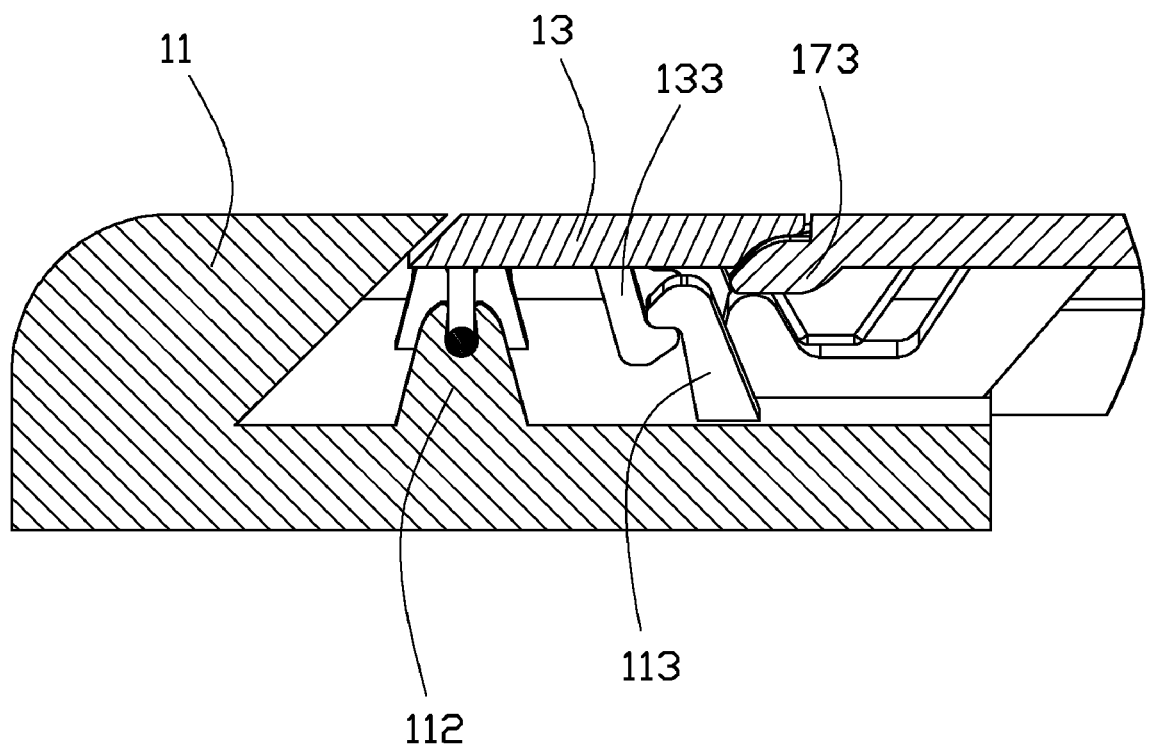
FIG. 5 is a cross sectional view of the battery cover assembly of FIG. 3 along line V-V.

During assembly of the battery cover assembly, referring to FIGS. 3 and 5, first, the pivot member 15 extends into the through holes 1311 of the fixed portions 131 allowing the pivot member 15 to be attached to the button 13. The button 13 is attached to the base body 11. Portions of the pivot member 15 exposed from the through holes 1311 are received in the grooves 112 of the support portions 110. The catches 133 are engaged with the hooks 113 to cause the button 13 to be mounted to the base body 11. Then, the tabs 175 of the battery cover 17 are received in the cutout 116 of the base body 11. The battery cover 17 is pressed downward, and slidably pushed toward the button 13. The tabs 175 are slidably received in the slot 117. The latching portions 1715 slide along the latch plates 135 until the latching portions 1715 latch with the latch plates 135. The protrusions 177 are received in the detents 119. The projections 173 are received in the notches 137. Thus, the battery cover 17 is assembled in the base body 11.

When the battery cover 17 is to be opened, the button 13 is pressed downward. The latch plates 135 force the clasp 171 to deform. At the same time, the projections 173 are pressed by the button 13. The clasp 171 is deformed allowing the latching portion 1715 to separate from the latch plates 135. The protrusions 177 exit from the detents 119. The tabs 175 exit from the cutouts 116 and the battery cover 17 can then be removed.

Figure 6:
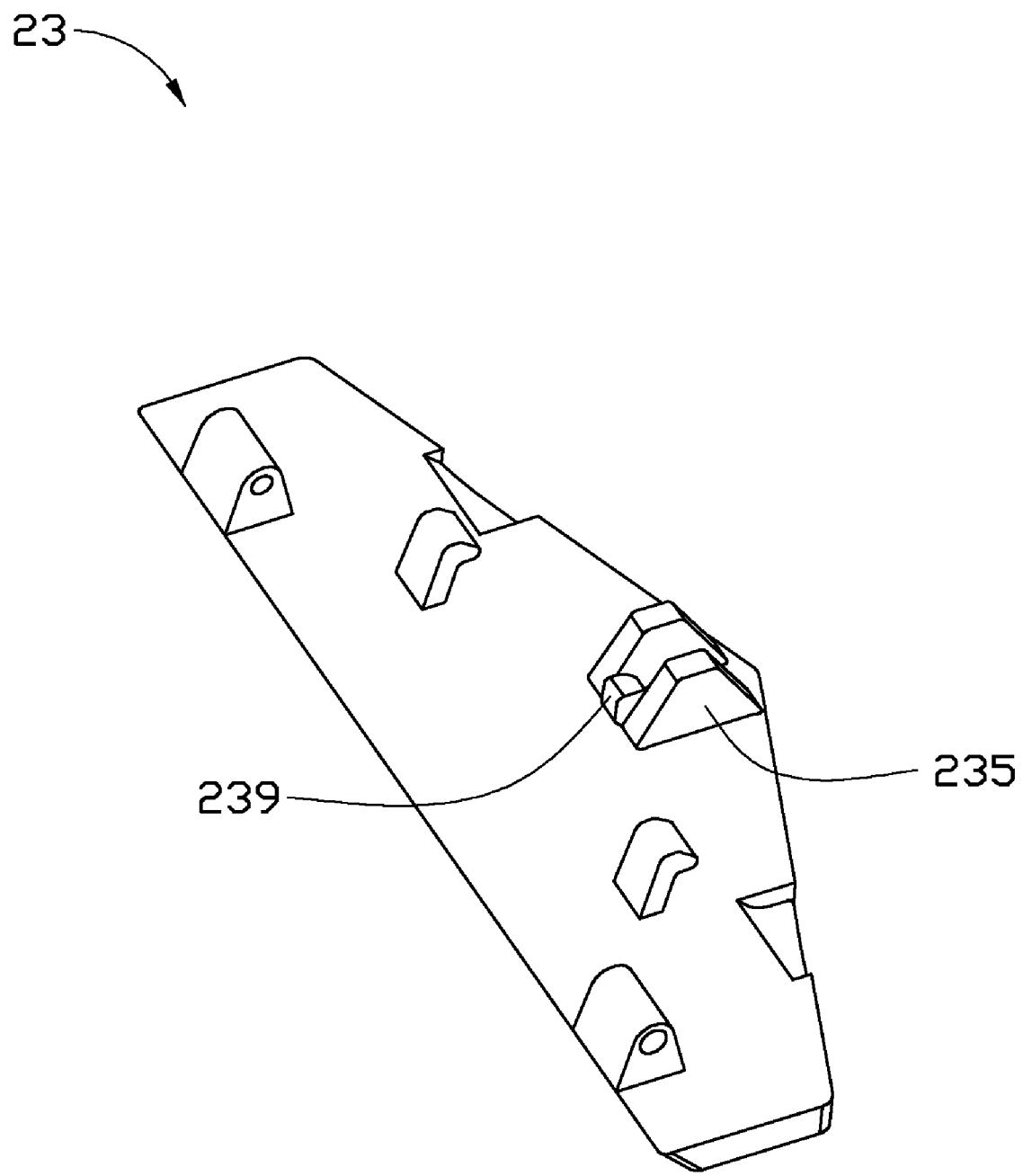
FIG. 6 is an enlarged view of the button in accordance with another exemplary embodiment.

Referring to FIG. 6, in another exemplary embodiment, button 13 forms a block 239 between the latch plates 235. When the clasp 171 engages with the latch plates 135, the latching portion 1715 is opposite to the block 239. The latching portion 1715 is spaced from the block 239 by about 0.1 mm. This distance may secure the clasp 171 to easily separate from the latch plates 135.

As described above, the exemplary embodiment provides a battery cover assembly for portable electronic devices, such as mobile phones. The battery cover of the battery cover assembly can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly for a portable electronic device, the battery cover assembly comprising: a base body forming two support portions; a battery cover forming a clasp; a pivot member received in the support portions; and a button rotatably connecting to the base body by the pivot member, the button forming two latch plates, the clasp engaging with the latch plates to allow the battery cover to releasably latch to the housing; wherein the button is substantially a symmetrical delta-shaped pentagon, the two latch plates are positioned at the vertex of the pentagon's two inclined sides; and wherein a notch is defined at each inclined side, the battery cover forms two projections for engaging in the notches.

2. The battery cover assembly as claimed in claim 1, wherein the base body forms two hooks, the button forms two catches, and the catches engage with the hooks.

3. The battery cover assembly as claimed in claim 1, wherein the button forms two fixed portions, each fixed portion defines a though hole, and the pivot member is received in the through holes.

4. The battery cover assembly as claimed in claim 3, wherein two catches are positioned between the fixed portions and the latch plates, and a distance between the catches is shorter than the distance between the two fixed portions.

5. The battery cover assembly as claimed in claim 1, wherein the clasp includes an inclined portion, an extended portion and a latching portion, the inclined portion is substantially parallel to one side of the latch plates, the extended portion substantially parallel to the battery cover.

6. A portable electronic device comprising: a base body; a battery cover forming a clasp; a pivot member; and a button rotatably connecting to the base body by the pivot member, the button forming two latch plates, the clasp engaging with the latch plates to allow the battery cover to releasably latch to the housing; wherein the base body forms two support portions, each support portion defines a groove, and the pivot member is received in the grooves; wherein the button is substantially a symmetrical delta-shaped pentagon, the two latch plates are positioned at the vertex of the pentagon's two inclined sides; and wherein a notch is defined at each inclined side, the battery cover forms two projections for engaging in the notches.

7. The portable electronic device as claimed in claim 6, wherein the base body forms two hooks at one side of the support portions, the button forms two catches, and the catches engage with the hooks.

8. The portable electronic device as claimed in claim 6, wherein the button forms two fixed portions, each fixed portion defines a though hole, and the pivot member is received in the through holes.

9. The portable electronic device as claimed in claim 8, wherein two catches are positioned between the fixed portions and the latch plates, and a distance between the catches is shorter than the distance between the two fixed portions.

10. The portable electronic device as claimed in claim 6, wherein the clasp includes an inclined portion, an extended portion and a latching portion, the inclined portion is substantially parallel to one side of the latch plates, the extended portion substantially parallel to the battery cover.

\* \* \* \* \*